United States Patent [19]

Tuson et al.

[11] 4,284,367
[45] Aug. 18, 1981

[54] MOVABLE-JOINT DEVICE FOR CONNECTING A SEA-BED EXPLOITATION COLUMN TO ITS BASE, CONNECTING AND DISCONNECTING PROCESSES USING THE SAID DEVICE, AND JOINT ELEMENT USED IN THE SAID DEVICE

[75] Inventors: Samuel Tuson, Mesnil-le-Roi; René Loire, Paris, both of France

[73] Assignee: Enterprise d'Equipements Mecaniques et Hydrauliques, France

[21] Appl. No.: 954,209

[22] Filed: Oct. 24, 1978

[30] Foreign Application Priority Data

Nov. 4, 1977 [FR] France ................... 77 33233

[51] Int. Cl.³ ........................................... B63B 35/44
[52] U.S. Cl. ................................... 405/202; 403/220; 403/226; 405/195
[58] Field of Search ............... 405/195, 202, 203, 207, 405/208, 204; 403/5, 58, 220, 221, 222, 223, 226; 52/40, 98, 99, 100, 116, 296, 298, 297

[56] References Cited

U.S. PATENT DOCUMENTS

| 1,596,744 | 8/1926 | Leipert ........................... 403/220 X |
| 3,193,059 | 7/1965 | Wallerstein ........................ 52/297 |
| 3,282,602 | 11/1966 | Willingshofer et al. ......... 403/226 X |
| 3,667,239 | 6/1972 | Mott ................................... 405/202 |

FOREIGN PATENT DOCUMENTS 729577 12/1942 Fed. Rep. of Germany ........... 403/226

Primary Examiner—Dennis L. Taylor
Attorney, Agent, or Firm—Steinberg & Raskin

[57] ABSTRACT

This invention relates to an universal movable-joint device for connecting a sea-bed exploitation column to its base arranged on the sea floor. This device is essentially constituted by a joint element of resiliently deformable material interposed between the foot of the column and the base and connected to the said foot and base, respectively.

16 Claims, 8 Drawing Figures

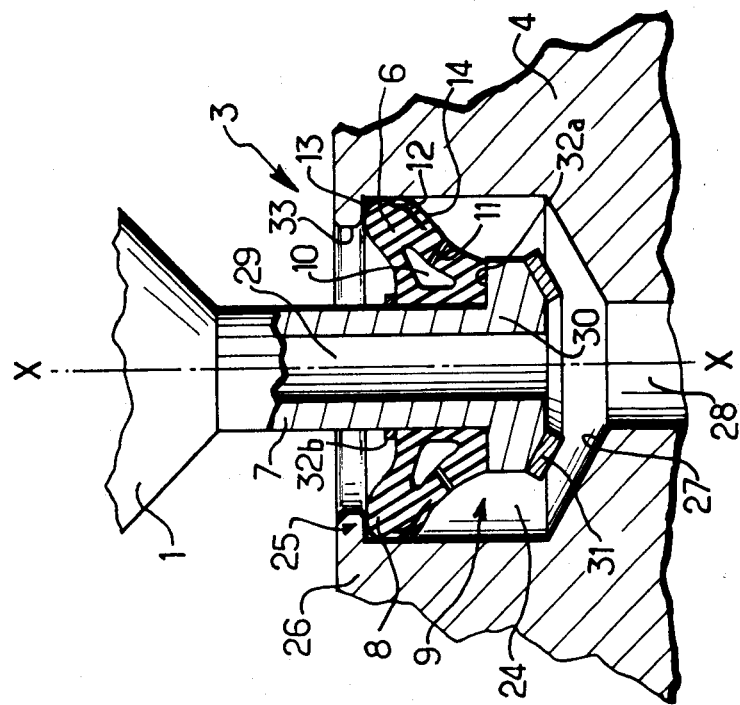
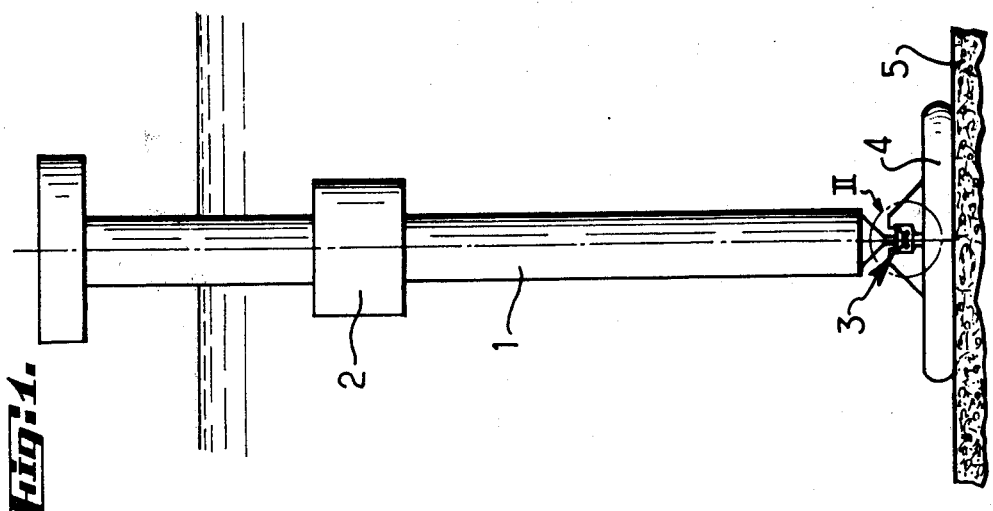

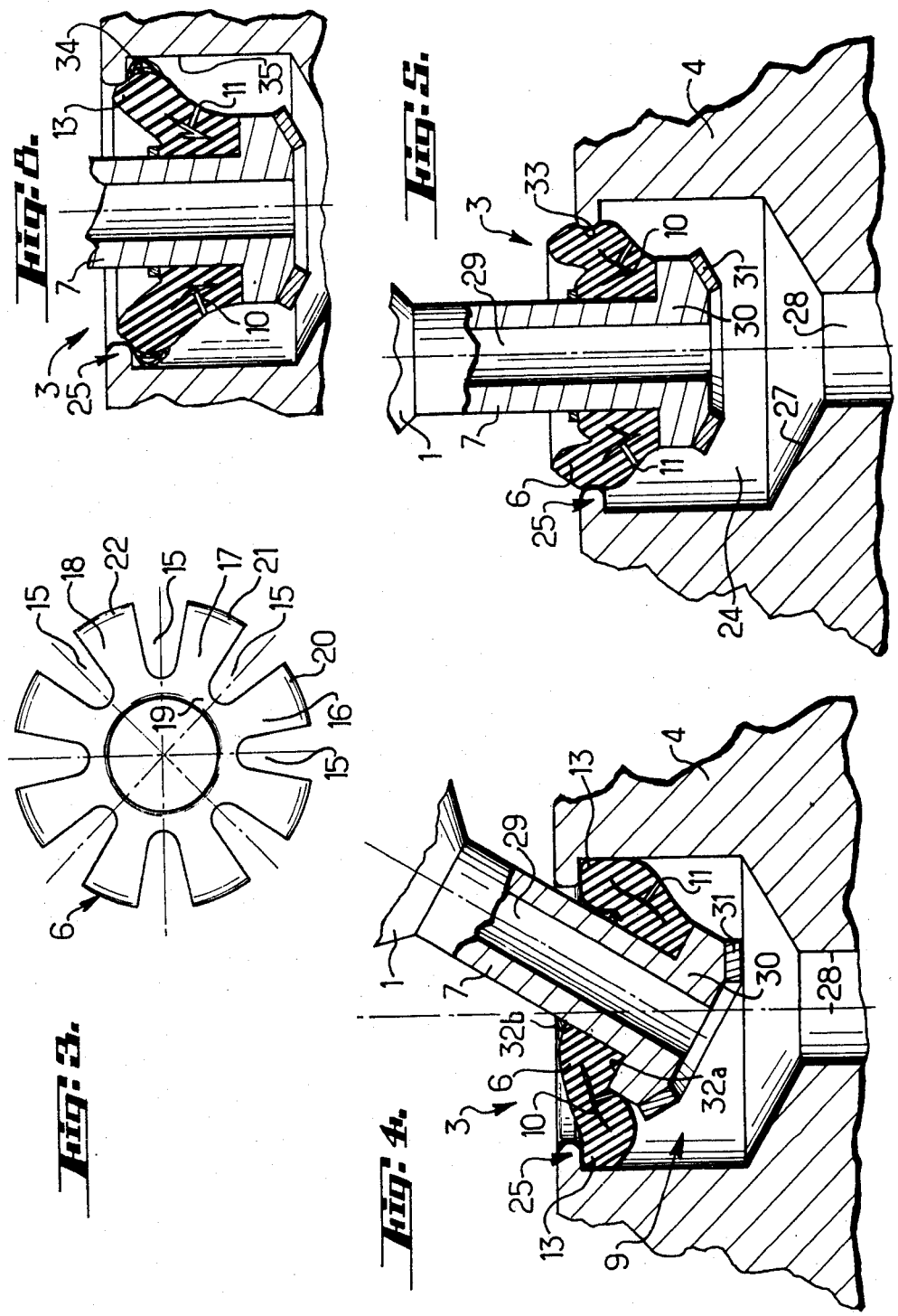

MOVABLE-JOINT DEVICE FOR CONNECTING A SEA-BED EXPLOITATION COLUMN TO ITS BASE, CONNECTING AND DISCONNECTING PROCESSES USING THE SAID DEVICE, AND JOINT ELEMENT USED IN THE SAID DEVICE

The present invention has essentially for its object a movable-joint device for connecting a sea-bed exploitation column to its base, a connecting process and a disconnecting process using the said device, as well as a joint element used in the said device.

There is already known a universal movable-joint device for connecting a sea-bed exploitation column to its base resting on the sea floor. This type of device was hitherto composed of metal members and consisted of a cardan-type joint.

However, such a type of movable-joint has a relatively complex organic structure and the processes of connecting and disconnecting the column to and from its base are relatively long and sometimes difficult to perform and are therefore expensive for they require considerable labor. Moreover, the metal members of the movable joint are liable to sea-water corrosion susceptible of reducing the life of such a movable joint and requiring considerable maintenance work, especially as the joint is subjected to considerable compressive and/or tensile stresses during the oscillation of the column, resulting in wear between the members of the joint.

The purpose of the present invention is therefore to obviate the afore-mentioned drawbacks by providing a solution allowing the column to be very rapidly connected to or disconnected from its base, and ensuring a satisfactory working life and a relatively simple structure.

This solution consists, according to the invention, of a universal movable-joint device for connecting a sea-bed exploitation column to its base resting on the sea floor, characterized in that it is essentially constituted by a joint element of resiliently deformable material interposed between the column foot and the base and connected to the said foot and to the said base, respectively. Preferably, the resiliently deformable element is annular in shape, is mounted on the column foot in substantially coaxial relationship thereto and displays a radially protruding peripheral portion adapted to be engaged into and retained or locked at least unilaterally in a corresponding recess of the base, preferably with prestress.

Advantageously, the resiliently deformable element in the nonstressed free condition, or in the vertical working position of the column, is substantially symmetrical in shape with respect to the longitudinal axis of the column and has substantially the shape of a solid of revolution about the said longitudinal axis, displaying notably an at least approximately frustoconical, e.g. tulip-shaped or bell-shaped, configuration. According to a particular form of embodiment of the device, the resiliently deformable element comprises in its body at least one annular internal hollow provided preferably with at least one vent orifice permanently connecting it with the surrounding medium.

According to another particular form of embodiment, the device comprises selectively operable coercive means serving to at least partially contract substantially radially the said radially protruding annular portion, and the said coercive means are either incorporated in the said element or are provided exteriorly thereof.

According to a still another particular form of embodiment of the device, the resiliently deformable element comprises external radial notches or slots defining between themselves segments with a common base.

The present invention also relates to a process for movably connecting a column, notably one provided with a float, to its base, characterized in that it comprises the following successive steps:

moving the column provided with its resilient element to a substantially vertical position above the recess of the base, driving the column foot into the said recess, in particular by ballasting the column, until the entire resilient element has moved past the inwardly projecting edge of the said recess, and exerting an upward force on the said column, notably by deballasting the same to allow the resilient element to abut against the said edge.

Also, the present invention relates to a process for disconnecting the said column, characterized in that it comprises the following successive steps:

driving the column foot into the said recess, notably by ballasting the column, until the said foot abuts against the bottom of the recess, actuating the coercive means until the said element is capable of at least partially moving past the inwardly projecting edge of the said recess, and exerting an upward force on the column, notably by deballasting the same, until the said resilient element is moved past the said edge and entirely outside the said recess, thus extracting the column foot from the said recess.

Lastly, the present invention relates, as a novel industrial product, to a joint element constituted by a member cast at least partially in a single piece and constituting the essential part of the said movable-joint device.

Other purposes, advantages and characterizing features of the present invention will appear more clearly from the following explanatory description made with reference to the appended diagrammatic drawings illustrating two presently preferred forms of embodiment and given solely by way of example.

In the drawings:

FIG. 1 is a diagrammatic view of a column movably jointed to its base arranged on the sea floor, in vertical position, provided with a movable-joint device according to the invention;

FIG. 2 is an enlarged partial radial sectional view of the encircled portion II of FIG. 1, illustrating a first form of embodiment of the device according to the invention;

FIG. 3 is a cross-sectional view of a second form of embodiment of the device according to the invention;

FIG. 4 is a partial sectional view similar to that of FIG. 2, showing the column in inclined position with corresponding deformation of the movable joint;

FIG. 5 is a partial sectional view illustrating the stage of connection of the column relative to its base with the resiliently deformable element of the device according to the invention, shown in FIG. 2, partially inserted into the cavity of the base;

FIG. 8 illustrates an alternative form of embodiment of the device provided with coercive means outside the joint.

Figure 6:
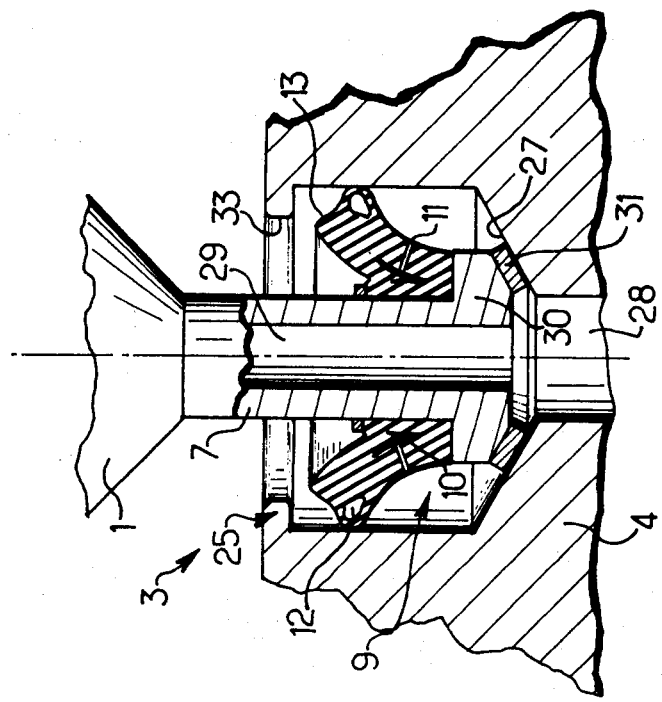
FIGS. 6 and 7 are partial sectional views illustrating various stages of the process of disconnection of the column relative to its base.

Referring to FIG. 1, an exploitation column 1 provided with a float 2 comprises a universal movable-joint device 3 for connecting the said column to its base 4 arranged on the sea floor 5.

Referring to FIG. 2, the movable-joint device 3 is essentially constituted by a joint element 6 of resiliently deformable material interposed between the foot 7 of column 1 and the base 4 and connected therewith.

Preferably, the resiliently deformable, ring-shaped element 6 is mounted on the foot 7 of column 1 in substantially coaxial relationship therewith and displays a radially protruding peripheral portion 8 adapted to be engaged into and retained at least unilaterally in a corresponding recess 9 of the base 4, preferably with prestress. The resiliently deformable element 6 in the non-stressed free condition or in working condition on the column in vertical position, is substantially symmetrical in shape with respect to the longitudinal axis X—X of column 1 and preferably substantially in the shape of a solid of revolution about the said longitudinal axis X—X, displaying notably an at least approximately frusto-conical, e.g. tulip-shaped or bell-shaped, configuration. Preferably, the shape of the resiliently deformable element 6 in the condition corresponding to its working position is as illustrated in the drawings, the said shape forming part of the invention as a particular form of embodiment of the element 6.

Also, the resiliently deformable element 6 may comprise in its body at least one annular hollow 10 preferably provided with one or several vent orifices 11 for permanent connection with the surrounding medium.

Also, the device 3 may be provided with selectively operable coercive means serving to at least partially contract substantially radially the radially projecting annular portion 8 of the element 6, the said coercive means being either incorporated in element 6 or arranged exteriorly thereof.

The coercive means advantageously comprise an inflatable annular cavity 12 located in the body of element 6 between the internal hollow 10 and the radially external edge 13 of element 6, particularly in proximity to the lower face 14 of the peripheral edge 13 of element 6. The cavity 12 in the normal working position of the said element is substantially flat as shown in FIG. 2.

According to a second form of embodiment of the resiliently deformable element illustrated in FIG. 3, the latter displays external radial notches 15 defining between themselves segments such as 16, 17, 18 with a common base 19. Preferably, each segment 16, 17, 18 comprises an inflatable cavity constituting the aforesaid coercive means located towards the lower face of the peripheral edge 20, 21, 22, respectively, of the said segment.

According to an alternative form of embodiment illustrated in FIG. 8, the coercive means is an inflatable annular sheath 34 secured to a stationary support (such as the internal lateral surface 35 of the recess 9) coaxially surrounding the element 6 and adapted, when inflated, to move into pressed contact therewith.

Moreover, as seen in FIG. 2, the recess 9 of the base 4 is constituted by an accomodating cavity 24 of a shape mating with that of the said resilient element, e.g. substantially cylindrical with a diameter greater than that of the foot 7 of column 1 but smaller than the maximum diameter of the element 6 in the free non-stressed condition, so that the latter when mounted is tightly engaged therein, the said accomodating cavity 24 being provided with stop means 25 for retaining the element 6. Preferably, the retaining or stop means 25 are constituted by a radially internal annular shoulder in proximity to the upper end 26 of the cavity 24, against which the projecting peripheral portion 13 of element 6 abuts.

Also, the accomodating cavity 24 has a bottom 27, e.g. with a concave, substantially frusto-conical profile, and the base 4 comprises a bore 28 whose axis substantially coincides with the axis X—X of the mounted column in vertical position, the said bore opening into the accommodating cavity 24 and connecting the accommodating cavity 24 with the sea floor 5. The axis of the bore 28 therefore also coincides, when the mounted column is in vertical position, with the axis of the opening 29 provided within the said column for the passage, in a known manner, of the lines for exploiting the deposits located in the sea bed.

Also, the free end 30 of foot 7 of column 1 is preferably of convex frusto-conical shape substantially mating with the shape of the bottom 27 of the recess 9, with which the said end is intended to temporarily come into contact for example as illustrated in FIG. 6. To this end, the end 30 of the foot 7 of column 1 may be provided with a pad or buffer element 31 which is for example annular and cast in one piece or segmented.

The column foot 7 may also be provided with means for holding the element 6 so as to prevent its displacement in the axial direction X—X of the foot 7 of column 1 and comprising an annular shoulder 32a integral with the foot 7 and a retaining ring 32b mounted on the foot shank.

The operation of the above-described column in the mounted condition will now be described with reference to FIG. 4.

When the column 1, owing to its float 2, oscillates under the action notably, of heave or of the wind, the peripheral edge 13 of the element 6 undergoes a bending the amplitude of which varies along the periphery of the external edge 13. A minimum bending takes place on the side where the column is inclined, whereas maximum bending takes place on the opposite side. The flexibility of the element 6 is improved by the presence of the hollow 10 which, through the vent 11, may be emptied of the water which it contains, as shown in FIG. 4. Moreover, the retaining or stop means 25 prevent the peripheral edge 13 of the element 6 from casually escaping from the recess 9 of the base 4.

On the other hand, as will be explained hereafter, the resiliently deformable element 6 greatly facilitates the processes of connection and disconnection of the column 1 relative to its base 4.

Referring to FIG. 5, the connection of the column 1 provided with its float 2 to its base 4 comprises the following successive steps.

The column 1 provided with its resilient element 6 is brought to a substantially vertical position above the recess 9 of the base 4. The foot 7 of the column 1 is driven into the recess 9, in particular by ballasting 0 which allows the resilient deformation of the element 6 to be increased. If the element 6 is provided with radially external slots, as illustrated in FIG. 3, it is those slots that facilitate the resilient deformation of the element 6.

Lastly, an upward force is exerted on the column 1, notably by deballasting the same, so that the element 6 moves into abutment against the retaining means 25, as shown in FIG. 2.

Figure 7:
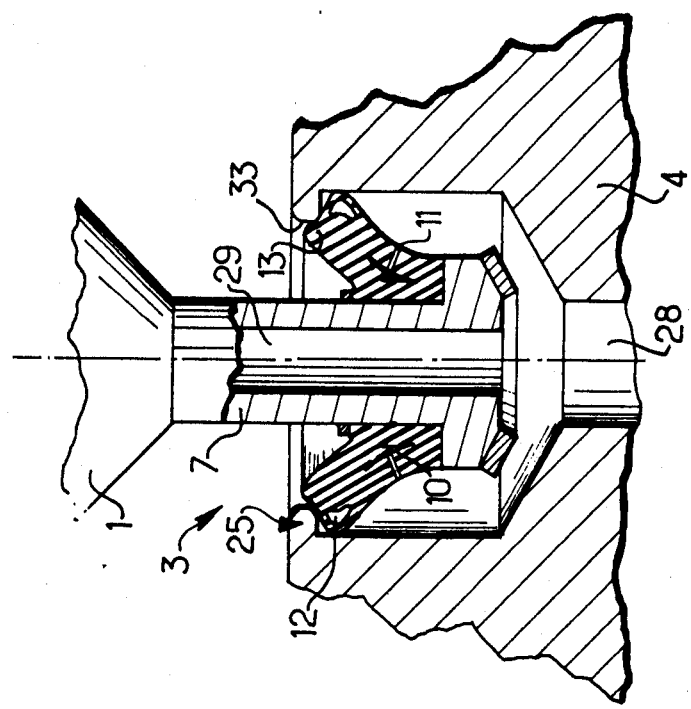

Referring to FIGS. 6 and 7, the disconnection of the column comprises the following successive steps.

The foot 7 of column 1 is driven into its recess 9, notably by ballasting the column 1, until the foot 7 abuts against the bottom 27 of the recess 9 (see FIG. 6). The coercive means, which are for example formed by the annular cavity 12 in FIG. 6, are inflated until the element 6 is capable of at least partially moving past the flange 33 of the abutment means 25 of the recess 9. An upward force is thereafter exerted on the column, notably by deballasting the same, thus causing the resilient element 6 to move into abutment against the flange 33 of the abutment means 25, a portion of the external edge 13 of element 6 having moved past the flange 33 of the abutment means 25 owing to the radial contraction caused by the inflation of the annular cavity 12. The cavity 12 is deflated, thus allowing the resilient element 6 to entirely move past the flange 33 of the abutment or stop means 25 under the action of the upward force resulting from the deballasting of the column. The element 6 is thus completely outside the recess 9, thus allowing the foot 7 of the column to be extracted from the recess 9. The disconnection of the column from its base is thus completed.

In case the coercive means are formed by an inflatable annular sheath 34 secured to an external stationary support coaxially surrounding the element 6, an inflating operation is carried out to radially contract the element 6, so that the external edge 13 of the said element can at least partially move past the flange 33 of the abutment means 25 (see FIG. 8).

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A universal movable-joint device for removably connecting a sea-bed exploitation column to its base arranged on the sea floor, said column comprising a shaft with a top end preferably emerging from the sea and a bottom end or foot located near the sea-bottom defining thereby an emerged upper part and a submerged lower part, said column being provided with a buoyant float means for biasing the shaft towards a substantially vertically extending position when the same is connected to said base, characterized in that said movable-joint device is essentially constituted by a joint element of resiliently deformable material interposed between the foot of the column and the base and connected to the said foot and base, respectively to removably joint said column to said base and to permit the free oscillation of the column with respect to its base under the action of sea heave or of the wind.

2. The device of claim 1, characterized in that the said resiliently deformable element is annular in shape, is mounted on the column foot in substantially coaxial relationship thereto, and displays a radially protruding peripheral portion adapted to be engaged into and retained or locked at least unilaterally in a corresponding recess of the base, preferably with prestress.

3. The device of claim 2, characterized in that the said resiliently deformable element, in the non-stressed free condition, or in the working vertical position of the column, is substantially symmetrical in shape with respect to the longitudinal axis of the column and, preferably, has substantially the shape of a solid of revolution about the said longitudinal axis, displaying notably an at least approximately frusto-conical, e.g. tulip-shaped or bellshaped, configuration.

4. The device of claim 1, characterized in that the resiliently deformable element comprises, in its body, at least one annular internal hollow, preferably provided with at least one vent orifice permanently connecting it to the surrounding medium.

5. The device of claim 2, characterized in that it comprises selectively operable coercive means serving to substantially radially contract at least partially the said radially projecting annular portion, and in that the coercive means are either incorporated in the said element or provided exteriorly thereof.

6. The device of claim 5, characterized in that the said coercive means comprise an inflatable annular cavity located in the body of the said element, between the said annular internal hollow and the radially external edge of the said element, particularly in proximity to the lower face of the protruding peripheral edge of the element, the said cavity being substantially flattened in the normal working position of the said element.

7. The device of claim 5, characterized in that the said resiliently deformable element comprises external radial notches or slots defining there between segments with a common base.

8. The device of claim 7, characterized in that each segment comprises an inflatable cavity constituting the afore-said coercive means and located towards the lower face of the peripheral edge of the said segment.

9. The device of claim 5, characterized in that the said coercive means are constituted by an inflatable annular sheath secured to an external stationary support, coaxially surrounding the said element and capable, when inflated, to move into pressed contact with the latter.

10. The device of claim 2, characterized in that the said recess of the base is constituted by an accommodating cavity of a shape mating with that of the said resilient element, e.g. a substantially cylindrical cavity greater in diameter than the foot of the column but smaller than the maximum diameter of the element in the non-stressed free condition, so that the latter when mounted is tightly engaged therein, said accommodating cavity comprising stop means for retaining the said element.

11. The device of claim 10, characterized in that the said stop or retaining means are constituted by a radially internal annular shoulder in proximity to the upper end of the cavity and against which the protruding peripheral portion of the element moves into abutment.

12. The device of claim 11, characterized in that the said accommodating cavity has a bottom of substantially frusto-conical concave profile, and in that the base comprises a bore, the axis of which substantially coincides with the axis of the column in mounted vertical position, the said bore opening into the accommodating cavity and connecting the accommodating cavity with the sea bottom.

13. The device of claim 2, characterized in that the free end of the column foot has a convex frusto-conical shape substantially mating with the shape of the bottom of the afore-said recess with which the said end is intended to temporarily move into contact.

14. The device of claim 1, characterized in that the column foot is provided with holding means for the said resiliently deformable element, preventing its motion in the axial direction of the column foot.

15. A process for connecting a sea-bed exploitation column, comprising a shaft with a top end preferably emerging from the sea and a bottom end or foot located near the sea bottom defining thereby an emerged upper part and a submerged lower part, said column being provided with a float for keeping the shaft in an at least approximately vertical position in its connected position, said column being movably jointed to its base disposed on the sea bottom by a device essentially constituted by a joint element of resiliently deformable material interposed between the foot of the column and the base and connected to said foot and base, respectively, to permit the free oscillation of the column with respect to its base, characterized in that it comprises the following successive steps:
- moving the column provided with its resilient element to a substantially vertical position above a recess formed in the base,
- driving the foot of the column into the said recess, in particular by ballasting the column, until the entire resilient element has moved past an inwardly projecting edge of the said recess, and,
- exerting an upward force on the said column, notably by deballasting the same, to allow the said element to move into abutment against the said inwardly projecting edge.

16. A process for disconnecting a sea-bed exploitation column, comprising a shaft with a top end preferably emerging from the sea and a bottom end or foot located near the sea-bottom defining thereby an emerged upper part and a submerged lower part, said column being provided with a float for keeping the shaft in an at least approximately vertical position in its connected position, said column being movably jointed to its base by means of a device essentially constituted by a joint element of resiliently deformable material interposed between the foot of the column and the base and connected to said foot and base, respectively, to permit the free oscillation of the column with respect to its base, said column and base being associated with coercive means, characterized in that it comprises the following successive steps:
- driving the foot of the column into a recess formed in the base, notably by ballasting the column, until the said foot abuts against the bottom of the recess,
- actuating the coercive means until the said element is capable of at least partially moving past an inwardly projecting edge of the said recess,
- exerting an upward force on the column, notably by deballasting the same, until the said resilient element, having moved past the said inwardly projecting edge, is entirely outside the said recess, thus extracting the column foot from the said recess.

* * * * *